UNITED STATES PATENT OFFICE.

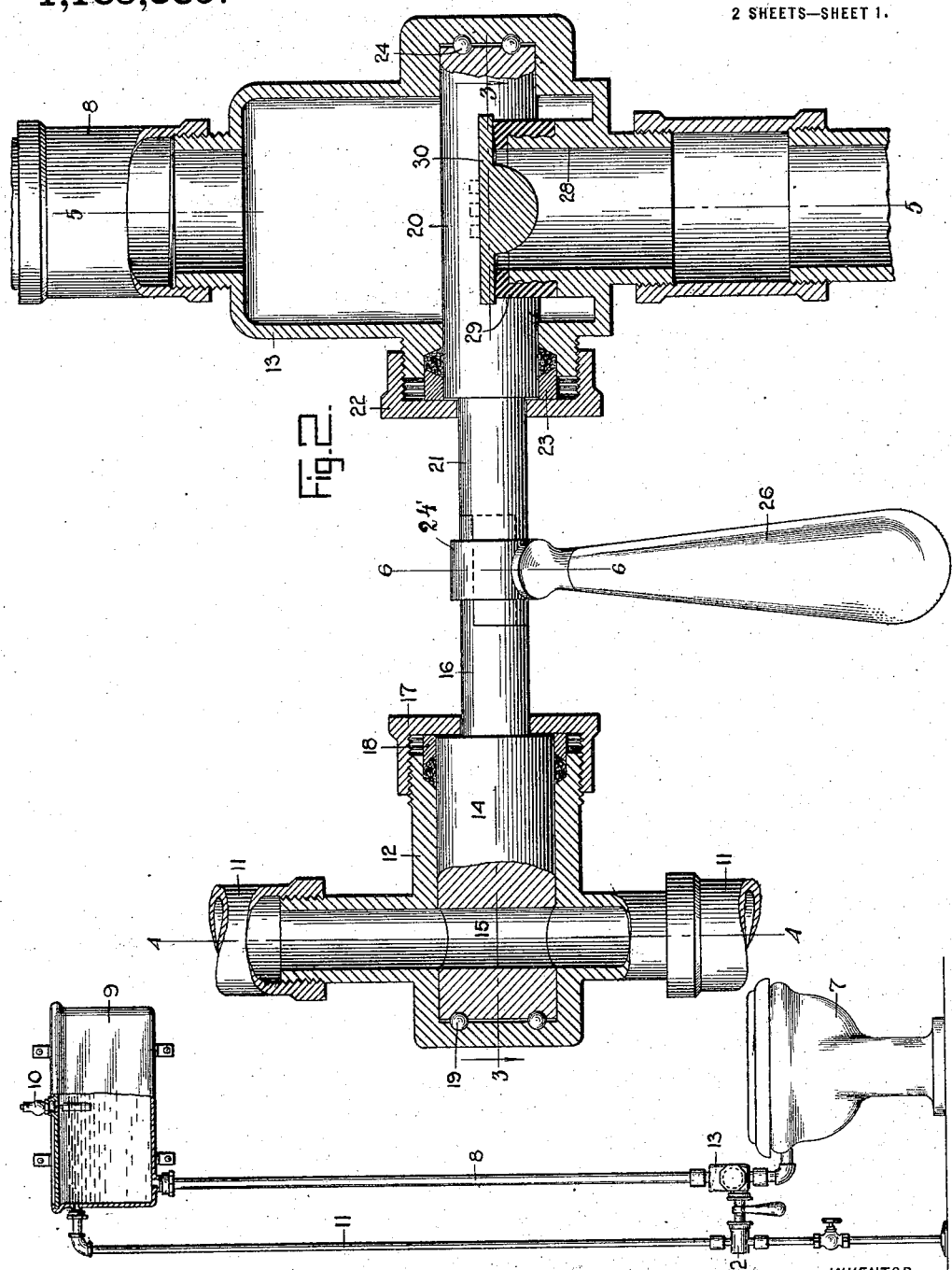

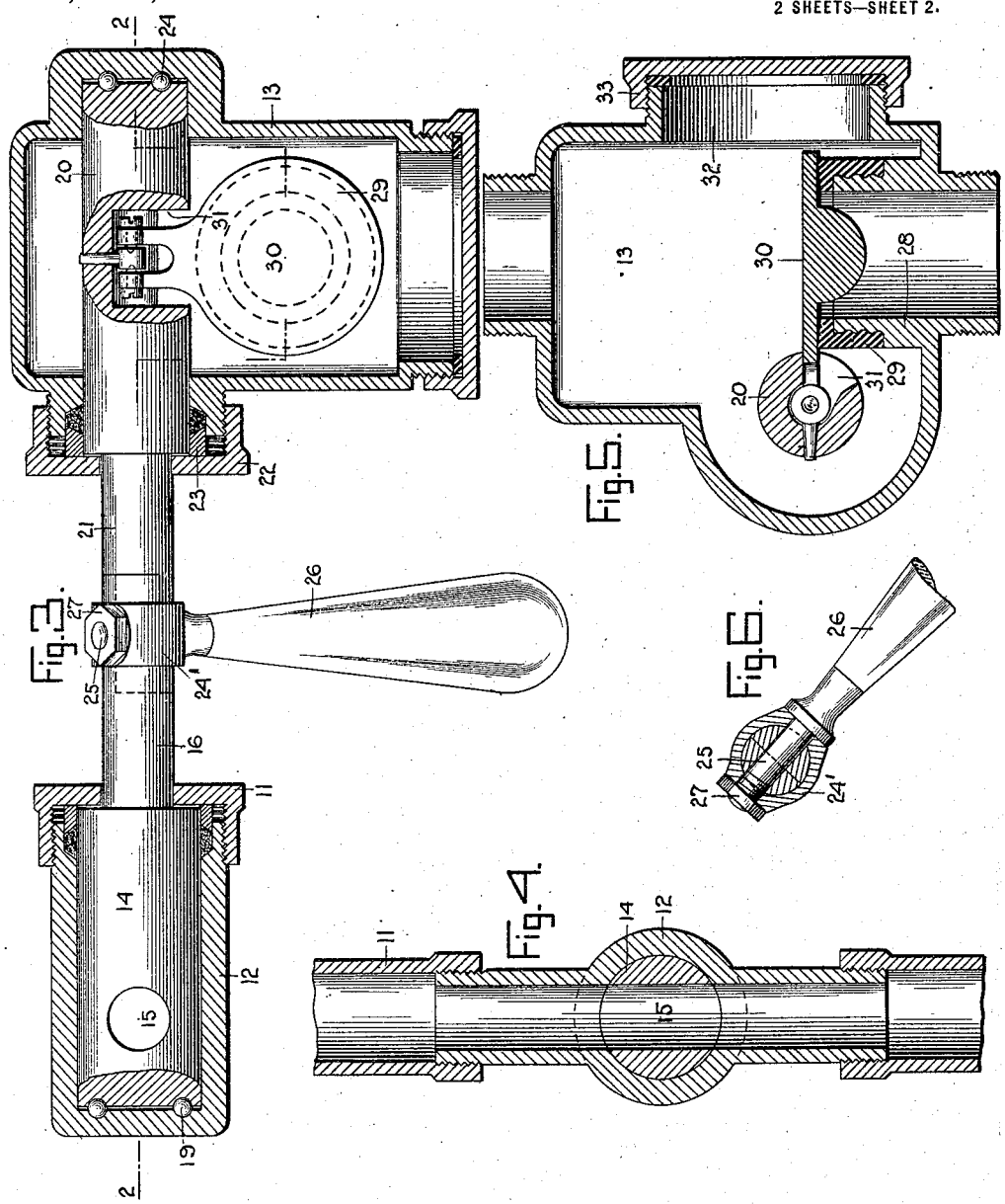

MIGUEL FERRER, OF SANTURCE, PORTO RICO.

FLUSH-TANK.

1,185,389. Specification of Letters Patent. Patented May 30, 1916.

Application filed April 1, 1915. Serial No. 18,461.

*To all whom it may concern:*

Be it known that I, MIGUEL FERRER, a citizen of Porto Rico, and a resident of Santurce, Porto Rico, have invented a new and Improved Flush-Tank, of which the following is a full, clear, and exact description.

My invention relates to flush tanks, and has reference more particularly to the fluid-flow control to and from the tank.

The object of the invention is to provide a simple, convenient, efficient and economical structure whereby the flow of fluid to the tank proper is controlled in such a way that when the tank is discharging the same is cut off from the main supply, and when the flow is cut off from the tank the same is connected to the main supply.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is an elevation of a watercloset seat provided with an embodiment of my invention; Fig. 2 is a vertical section on line 2—2, Fig. 3; Fig. 3 is a horizontal section on line 3—3, Fig. 2; Fig. 4 is a vertical section on line 4—4, Fig. 2; Fig. 5 is a similar section on line 5—5, Fig. 2; and Fig. 6 is a section on line 6—6, Fig. 2.

Referring to the drawings, 7 represents a watercloset bowl which is connected by a conduit 8 to the bottom of the flush tank 9 which is water tight and provided with an air-release valve 10. Connected to the tank adjacent the top thereof is a main conduit 11. Located on the conduit 11 is a valve casing 12 which faces a valve casing 13 on the conduit 8, both casings being adjacent the bowl 7. The casing 12 carries a cylindrical valve 14 which fits snugly into the casing 12 and has a bore 15 adapted to register with the openings in the casing 12 leading to the conduit 11. The stem 16 of the valve projects through a cap 17 which controls a stuffing gland 18 and is adapted to maintain the valve 14 in proper position in the valve casing 12. Ball bearings 19 are interposed between the bottom of the casing 12 and the bottom of the valve 14 which reduces the friction therebetween.

The valve casing 13 on the conduit 8 carries a spindle 20, the stem 21 of which projects through a cap 22 controlling a packing gland 23 of the valve casing 13 and maintains the spindle in proper position within the casing, ball bearings 24 being interposed between the end of the spindle and the casing. The stems 21 and 16 are in alinement and have their ends spliced. Fitting over the spliced ends is a ring 24' which has alining openings registering with an opening through the spliced ends adapted to accommodate a threaded end 25 of a handle 26 which is tied to the ring, and, consequently, to the stems by a nut 27 or any other suitable means.

The valve casing 13 has an interior annular shoulder 28 at the lower part of the casing. The end of the shoulder is reduced and corrugated to receive a rubber sleeve 29 forming a valve seat for a flap valve 30 which is hinged to the spindle 20 so that the said spindle will have an initial displacement before causing the displacement of the flap valve 30. This is obtained by cutting out a sector 31 in the spindle 20 where an extension of the flap valve 30 is in engagement with the spindle. The principal part of the valve casing 13 is large enough to accommodate the flap valve 30 when the same is operated by means of the handle 26. The said valve casing 13 is provided with an opening 32 closed by a cap 33. Through this opening the flap valve 30 is connected to the spindle, also any repairing or changing of parts that may be necessary due to wear can be made within the valve casing 13.

When the handle 26 is in the position indicated in Figs. 2 and 3, the flap valve 30 closes the portion of the conduit 8 below the collar 28 leading to the bowl 7, while the valve 14 establishes communication between the flush tank 9 and the main supply. When the bowl is to be flushed by the water in the tank, the handle 26 is moved, consequently the valve 14 and the spindle 20 are set in motion, thus the bore 15 of the valve 14 begins to move out of register with the openings in the valve casing. The said valve cuts off the main supply from the tank at a point where the sector 31 of the spindle 20 is to engage the extension of the flap valve 30. That is to say, the main supply is cut off from the flush tank before the discharge thereof begins. As the handle 26 continues its movement, the valve 30 is unseated and will be brought into the upper part of the casing 13, thus totally clearing the passage for the flow through the bowl. When the supply from the tank 9 is to be cut off, the valve is revolved in the opposite direction. The initial displacement of the spindle 20 and, consequently, of the valve 14, does not establish communication from the main supply to the tank, but only after the flap valve 30 has passed its vertical position, when, due to gravity, the same will fall on to its seat. At this point the bore 15 of the valve begins to register with the openings in the valve casing 12, and thus the pressure from the main will help to seat the flap valve 30. The air valve 10 on the flush tank is so arranged that although it will permit the escape of air necessary for the operation thereof it will prevent any escape of water from the tank under the pressure from the main supply.

In view of the fact that the flap valve 30 is forced against its seat not only by the column above the valve but by the pressure in the main, a perfect engagement between the flap valve and its seat is insured and there is no chance for leakage. The flush tank being closed, with the exception of the air valve which establishes communication therebetween and the atmosphere, there will be no hissing of air when the tank is flushed, as is heard in the present arrangement of flush tanks. It may be further remarked that with my valve the amount of water used for flushing a bowl can be controlled directly, therefore a more economical arrangement is obtained; as, for example, only so much of the contents of the tank can be used as desired by means of the double-acting valve, as described, in lieu of using the entire contents of the tank, as is necessary with the present arrangement. It will be noted that in my arrangement it is impossible to waste water, for a person cannot flush the bowl without first closing the main supply, nor can a person intentionally or otherwise open the inlet valve without first closing the flushing valve.

It is self-evident that the flushing tank can be located at any distance from the bowl, and that my arrangement can be used for low tanks and also for urinals, as a very small amount of water can be dispensed thereby. My structure does away with small valves, floating bowls, siphon seats, etc., all of which tend to easily get out of order.

While I have described the principle of operation, together with the device which I now consider to be the best embodiment thereof, I desire to have it understood that the device shown is merely illustrative and that such changes may be made as are within the scope of the appended claims.

I claim:

1. In combination,—a flush tank; a revoluble inlet valve normally connecting the tank to the main supply; a flap valve normally closing the outlet from the flush tank; and means for operating the flap valve having an initial displacement relative thereto, said means being connected to the inlet valve to revolve the same whereby said inlet valve is closed by the initial displacement of said means before the outlet valve is opened, said outlet valve being adapted to be closed by said means before the inlet valve is opened.

2. In combination,—a flush tank; a rotatable inlet valve normally connecting the tank with the main supply, said valve having a stem; an outlet valve for said tank comprising a flap valve hinged to a rotatably mounted spindle, said spindle having a stem, the latter stem and the stem of the inlet valve having spliced ends; and means uniting the spliced ends whereby the spindle and the valve can be rotated simultaneously, said spindle having a cut-out section whereby the same has a predetermined displacement before the flap valve is moved therewith, said cut-out being such that the inlet valve is closed before the flap valve is moved off its seat, said outlet valve being adapted to be returned to its closed position before the inlet valve is opened, substantially as and for the purpose set forth.

3. In combination,—a closed flush tank having an air valve; a rotatable inlet valve normally connecting the tank to the main supply; a flap valve normally closing the outlet from the flush tank; a spindle mounted to rotate to which the flap valve is hinged, said spindle having a cut-out portion whereby said spindle has an initial displacement relative to said flap valve, said spindle and inlet valves having stems the ends of which are spliced; and means locking the spliced ends whereby the valve and the spindle can be operated simultaneously, the cut-out in the spindle being such that when the inlet valve and spindle are moved simultaneously said inlet valve will be closed before the flap valve is engaged by the spindle, the flap valve and the inlet valve being so related that the said flap valve will engage its seat before the inlet valve is opened.

4. In combination,—a flush tank, a rotatable inlet valve normally connecting the tank with the main supply, a flap valve hinged to a rotatably-mounted spindle, forming the outlet valve for said tank, and means uniting the spindle with the rotatable valve for rotating the two simultaneously, said spindle having a cut-out section whereby the same has a predetermined rotary displacement before the flap valve is moved therewith and whereby the inlet valve is closed before the outlet valve is opened and the outlet valve is closed before the inlet valve is opened.

In testimony whereof I have signed my name to this specification in the presence of two subscribing witnesses.

MIGUEL FERRER.

Witnesses:
FERNANDO MONTILLA,
J. A. HERNÁNDEZ.

Copies of this patent may be obtained for five cents each, by addressing the "Commissioner of Patents, Washington, D. C."